(12) United States Patent
Gunder (10) Patent No.: US 11,685,061 B2
(45) Date of Patent: Jun. 27, 2023

(54) ARTICULATING GRIPPER TOOLING

(71) Applicant: PHD, Inc., Fort Wayne, IN (US)

(72) Inventor: Tod A. Gunder, New Haven, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 17/727,228

(22) Filed: Apr. 22, 2022

(65) Prior Publication Data

US 2022/0250258 A1  Aug. 11, 2022

Related U.S. Application Data

(63) Continuation of application No. 17/074,983, filed on Oct. 20, 2020, now Pat. No. 11,345,050.

(51) Int. Cl.
*B66C 1/00* (2006.01)
*B25J 15/04* (2006.01)
*B25J 15/08* (2006.01)

(52) U.S. Cl.
CPC ........... *B25J 15/08* (2013.01); *B25J 15/0475* (2013.01)

(58) Field of Classification Search
CPC ...... B25J 15/08; B25J 15/086; B25J 15/0038; B25J 15/022
USPC .......................................................... 294/106
See application file for complete search history.

(56) References Cited

U.S. PATENT DOCUMENTS

| | | |
|---|---|---|
| 1,938,485 A | 12/1933 | Cossor |
| 3,575,405 A | 4/1971 | Harding |
| 3,807,786 A | 4/1974 | Alegria |
| 3,879,078 A | 4/1975 | Turner |
| 4,211,123 A * | 7/1980 | Mack ...................... F16H 19/04 294/203 |
| 4,545,722 A | 10/1985 | Cutkosky et al. |
| 4,667,998 A * | 5/1987 | Borcea ................. B25J 15/0246 294/203 |
| 4,697,839 A | 10/1987 | Fischer |
| 5,178,431 A | 1/1993 | Voellmer |
| 6,056,281 A | 5/2000 | Moilanen et al. |
| 6,079,896 A | 6/2000 | Dellach |
| 6,089,631 A | 7/2000 | Thurlow et al. |
| 6,276,733 B1 | 8/2001 | Moilanen et al. |
| 6,530,616 B1 | 3/2003 | McIntosh et al. |

(Continued)

FOREIGN PATENT DOCUMENTS

| | | |
|---|---|---|
| DE | 37 31 471 A1 | 4/1989 |
| GB | 825553 | 12/1959 |

OTHER PUBLICATIONS

Extended European Search Report dated May 16, 2022 for European Patent Application No. 21203298.1 (7 pages).

*Primary Examiner* — Paul T Chin
(74) *Attorney, Agent, or Firm* — Taylor IP, P.C.

(57) ABSTRACT

A gripping device for gripping a workpiece includes: at least one gripping element configured for contacting the workpiece, the at least one gripping element including a shaft; at least one articulating finger jaw; a mounting block connecting the shaft to the at least one articulating finger jaw, the mounting block including an articulation stop having a first stopping surface and a second stopping surface; and a stopping member connected to the shaft, the stopping member being configured for contacting one of the first stopping surface and the second stopping surface to limit a rotation of the shaft relative to the mounting block, the stopping member being in the form of a fastener which is inelastic.

15 Claims, 6 Drawing Sheets

(56) References Cited

U.S. PATENT DOCUMENTS

| | | |
|---|---|---|
| 6,641,189 B2 * | 11/2003 | Moilanen ............... B25B 5/087 |
| | | 294/203 |
| 7,344,171 B1 | 3/2008 | McMullan |
| 7,661,739 B2 | 2/2010 | Burgmeier |
| 7,845,698 B2 | 12/2010 | Jenkins et al. |
| 7,854,456 B2 | 12/2010 | Waldorf et al. |
| 8,191,947 B2 | 6/2012 | Jouan De Kervanoael |
| 8,240,729 B2 | 8/2012 | Vittor |
| D678,377 S | 3/2013 | Umeno |
| 8,474,893 B2 | 7/2013 | Kawanami et al. |
| 9,067,324 B2 | 6/2015 | Matsuoka |
| 9,975,253 B2 | 5/2018 | De Castelbajac et al. |
| 10,011,025 B2 | 7/2018 | Gunder |
| D853,811 S | 7/2019 | Gunder |
| 2001/0015563 A1 | 8/2001 | Moilanen et al. |
| 2002/0093211 A1 | 7/2002 | Filipiak et al. |
| 2003/0116985 A1 | 6/2003 | Moilanen et al. |
| 2003/0197389 A1 | 10/2003 | Moilanen et al. |
| 2011/0133502 A1 * | 6/2011 | Koyama ............... B25J 15/08 |
| | | 294/106 |
| 2013/0341944 A1 * | 12/2013 | Schlaich ............... B25J 15/10 |
| | | 294/106 |
| 2014/0132020 A1 * | 5/2014 | Claffee ............... B25J 15/0475 |
| | | 901/31 |
| 2014/0232124 A1 * | 8/2014 | Dan ................... B25J 9/1065 |
| | | 294/198 |
| 2017/0232620 A1 | 8/2017 | Kalb et al. |
| 2017/0271306 A1 | 9/2017 | Wang et al. |

\* cited by examiner

FIG. 1

SECTION I-I

DETAIL J

ARTICULATING GRIPPER TOOLING

CROSS REFERENCE TO RELATED APPLICATIONS

This is a continuation of U.S. patent application Ser. No. 17/074,983, entitled "ARTICULATING GRIPPER TOOLING", filed Oct. 20, 2020, which is incorporated herein by reference.

BACKGROUND OF THE INVENTION

1. Field of the Invention

The present invention relates to mechanical grippers, and, more particularly, to the jaw tooling for such grippers.

2. Description of the Related Art

Grippers are mechanical devices with one or more jaws that are moved toward and away from one another by an electric motor, fluid powered piston, or other motion. In many cases, tooling attached to the jaws of the gripper is responsible for transferring the force of the gripper to a workpiece such that the workpiece may then be held, moved, or rotated. This tooling may need to be able to grasp workpieces that differ from one another in size, shape, draft, material, mass, and more.

Typically, gripper jaw tooling is designed to match the contour of the workpiece; in this way, the tooling will mate with the workpiece when the gripper applies force to grasp the piece resulting in maximized force transmission to the part. Designing and manufacturing tooling to match workpieces of differing size, shape, draft, material, mass, etc. can prove not only costly, but far less effective at maximizing the grip force applied to the workpiece.

U.S. Pat. No. 10,011,025, which is commonly owned by Applicant, discloses a gripper tooling device that allows the tooling to adapt to workpieces that differ from one another in size, shape, draft, material, mass, and more. The gripper tooling device includes a gripper element that is partially rotatable relative to the gripper jaw to which it is mounted. Hence, the gripper element may accommodate variously configured workpieces by rotating relative to the gripper jaw.

What is needed in the art is a cost-effective gripper tooling device that can accommodate variously configured workpieces.

SUMMARY OF THE INVENTION

The present invention provides a gripping device for gripping a workpiece. The gripping device includes at least one gripping element configured for contacting the workpiece, at least one articulating finger jaw, and a mounting block connecting the shaft of the at least one gripping element to the at least one articulating finger jaw. The mounting block includes an articulation stop having a first stopping surface and a second stopping surface. The gripping device further includes a stopping member connected to the shaft. As the shaft rotates in order for the at least one gripping element to accommodate the workpiece, the stopping member may contact the first stopping surface or the second stopping surface which then prevents further rotation of the shaft in the clockwise or counterclockwise direction.

The present invention in one form is directed to a gripping device for gripping a workpiece. The gripping device includes at least one gripping element configured for contacting the workpiece. The at least one gripping element includes a shaft. The gripping device further includes at least one articulating finger jaw and a mounting block connecting the shaft to the at least one articulating finger jaw. The mounting block includes an articulation stop having a first stopping surface and a second stopping surface. The gripping device further includes a stopping member connected to the shaft. The stopping member is configured for contacting one of the first stopping surface and the second stopping surface to limit a rotation of the shaft relative to the mounting block. The stopping member is in the form of one of a pin and a fastener.

The present invention in another form is directed to a method of gripping a workpiece. The method includes providing a gripping device for gripping a workpiece. The gripping device includes at least one gripping element configured for contacting the workpiece. The at least one gripping element includes a shaft. The gripping device includes at least one articulating finger jaw and a mounting block connecting the shaft to the at least one articulating finger jaw. The mounting block includes an articulation stop having a first stopping surface and a second stopping surface. The gripping device further includes a stopping member connected to the shaft. The stopping member is in the form of one of a pin and a fastener. The method further includes positioning the gripping device relative to the workpiece. The method further includes actuating the gripping device so that the at least one gripping element contacts the workpiece and the shaft rotates relative to the mounting block until the stopping member contacts one of the first stopping surface and the second stopping surface.

An advantage of the present invention is the ability for the gripper jaw tooling to automatically adapt to workpieces of differing size, shape, draft, material, mass, etc., thereby obviating the need for custom gripper jaw tooling to complement varying workpieces.

Another advantage of the present invention is the articulating section of the gripper jaw tooling can be constrained a predetermined and adjustable amount, thereby providing a secure attachment of the workpiece.

Yet another advantage of the present invention is the gripper element may be easily (dis)connected to the gripper jaw in order to easily repair, replace, or clean the various components the gripper tooling device.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
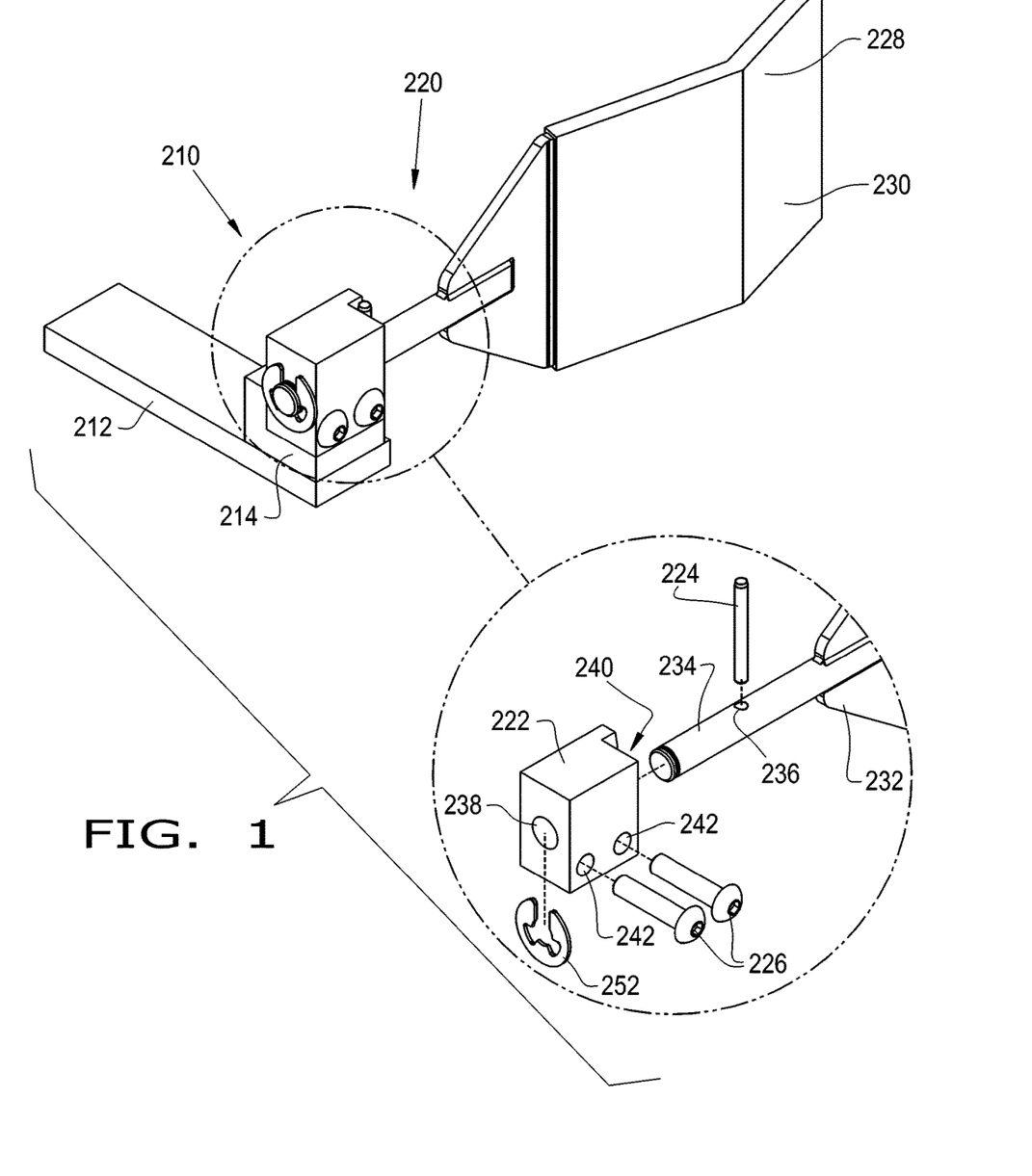
FIG. 1 is an isometric view and exploded view detail of an embodiment of gripper jaw tooling of the present invention.
Figure 2:
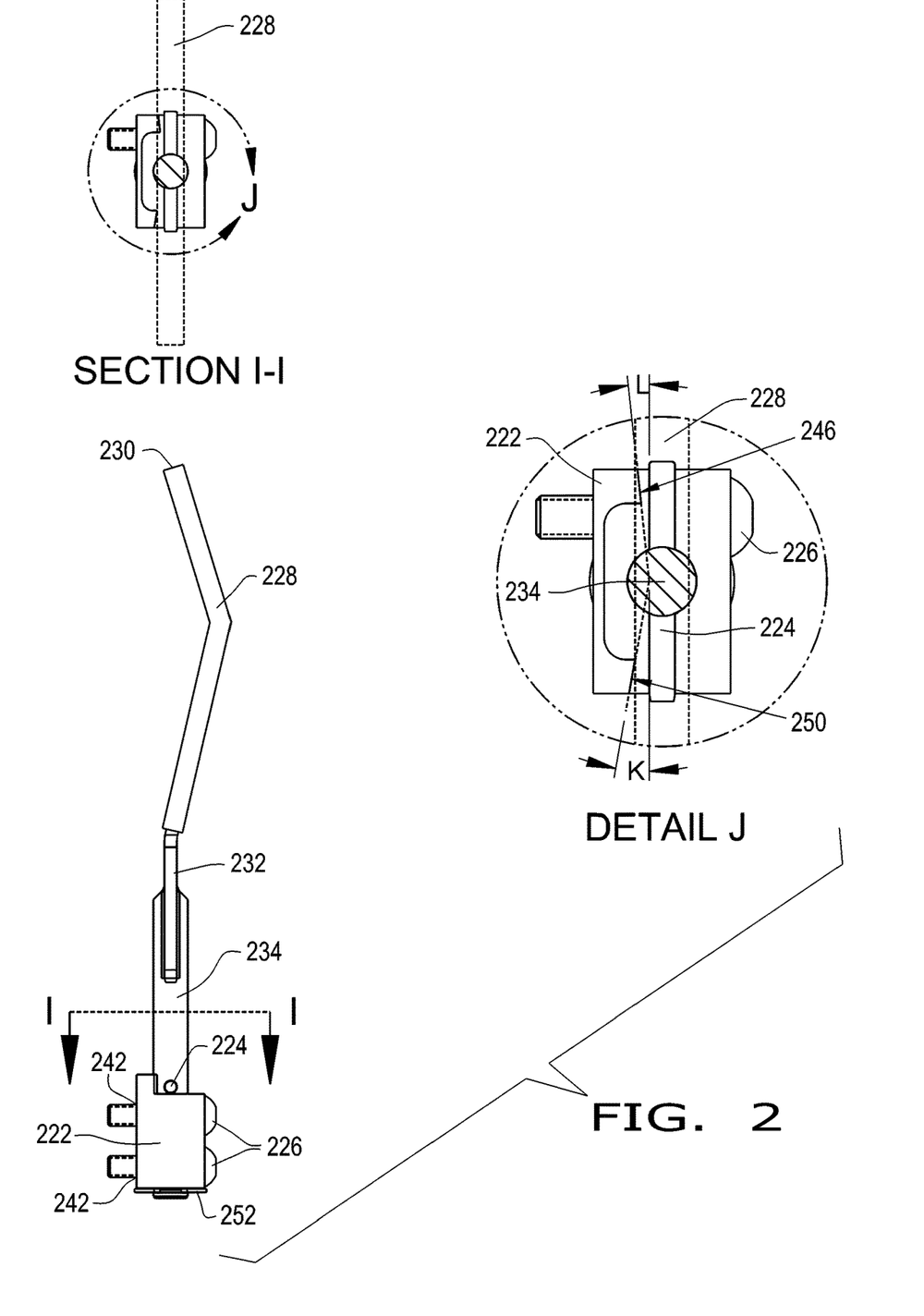
FIG. 2 is a top view of the gripper jaw tooling of FIG. 1.

Referring now to FIGS. 1-2, there is shown an embodiment of a gripping device 210 according to the present invention. Gripping device 210 includes main body 212, at least one gripper jaw 214, and articulating gripper tooling assembly 220. Gripping device 210 includes at least one additional gripper jaw 214 and articulating gripper tooling assembly 220 in order to provide a way of gripping a workpiece.

Articulating gripper tooling assembly 220 includes mounting block 222, stopping pin 224, mounting block attachment member(s) 226, and at least one gripping element 228. Gripping element 228 includes finger 230, finger extension 232, and finger shaft 234 with through-hole 236. Mounting block 222 includes through-hole 238, articulation stop 240, and attachment member through-hole(s) 242. Articulation stop 240 may be in the form of one or more protrusions, e.g. tab, which extend outwardly from the body of the mounting block. The one or more protrusions define stopping surfaces 246, 250 (FIG. 2). For instance, articulation stop 240 may be in the form of a single C-shaped protrusion that extends outwardly from the body of mounting block 222.

Gripping element 228 is rotatably attached to mounting block 222 by inserting finger shaft 234 into through-hole 238 and securing retaining clip 252. Stopping pin 224 can be rigidly connected to the shaft 234. For instance, the stopping pin 224 can be pressed or otherwise firmly attached through finger shaft through-hole 236. The shaft through-hole 236 may be centered along the transverse or vertical axis of shaft 234 such that stopping pin 224 is coaxial with the transverse axis of shaft 234. Mounting block 222, with or without gripping element 228 rotatably attached, is attached to jaw 214 by attachment member(s) 226 and through-hole(s) 242.

Now referring to FIG. 2, the operation of articulating gripper tooling assembly 220 is described. Section I-I illustrates the bi-directional rotational direction ("articulation") of gripping element 228 with respect to mounting block 222. The bi-directional rotation is limited as shown in Detail J. Mounting block 222 includes at least two stopping surfaces 246 and 250 in the path of stopping pin 224 as shown in Detail J. When attached to mounting block 222 by retaining clip 252, gripping element 228 is free to rotate in a counterclockwise direction until stopping pin 224 contacts stopping surface 246, thereby preventing additional counterclockwise rotation. Similarly, gripping element 228 is free to rotate in a clockwise direction until stopping pin 224 contacts stopping surface 250, thereby preventing additional clockwise rotation.

In one embodiment, the articulating angle K of gripping element 228 with respect to mounting block 222 is limited to 10 degrees in the clockwise direction, and the articulating angle L of gripping element 228 with respect to mounting block 222 is limited to 6 degrees in the counterclockwise direction as viewed in Detail J.

The horizontal distance from the longitudinal axis of stopping pin 224 to either the outer edge of stopping surface 246 or the outer edge of stopping surface 250 alters the rotating (articulating) angle in the respective direction of rotation. More specifically, increasing the horizontal distance from the longitudinal axis of stopping pin 224 to either the outer edge of stopping surface 246 or the outer edge of stopping surface 250 will increase the angle that the gripping element 228 will be free to articulate. Likewise, decreasing the horizontal distance from the longitudinal axis of stopping pin 224 to either the outer edge of stopping surface 246 or the outer edge of stopping surface 250 will decrease the angle that the gripping element 228 will be free to articulate. The horizontal distance between the longitudinal axis of stopping pin 224 and stopping surfaces 246, 250 can be adjusted by altering the position of shaft through-hole 236 and/or the position of the protrusion(s) of the articulation stop 240.

Figure 3:
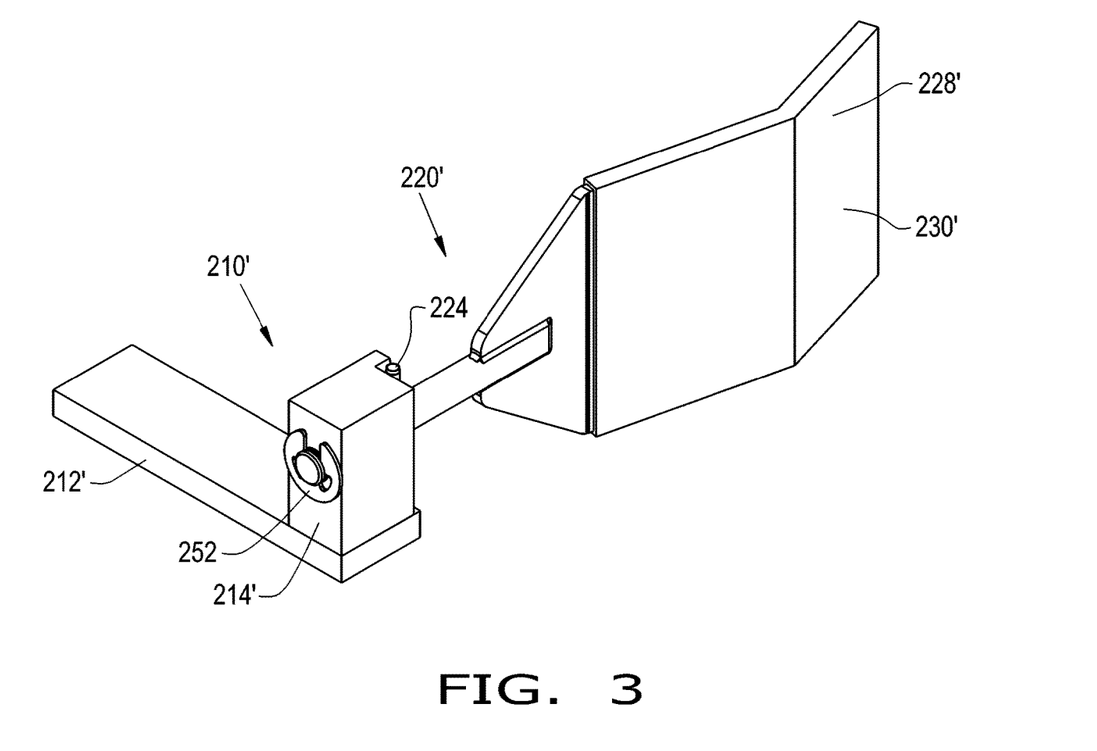
FIG. 3 is an isometric view of an alternate embodiment of the gripper jaw tooling of FIG. 1.

Referring now to FIG. 3, another embodiment of a gripper device 210' is shown with gripper tool assembly 220'. The only difference between 210' and 210 is that gripper tooling assembly 220' does not include a separate mounting block 222 with attachment members 226 or through-holes 242; gripping element 228 is rotatably coupled directly to at least one articulating finger jaw 214'. Finger jaw 214' includes a body with an integrated mounting block which includes an articulation stop in the form of one or more protrusions which define stopping surfaces 246, 250. Like elements have been identified with like reference characters.

Figure 4:
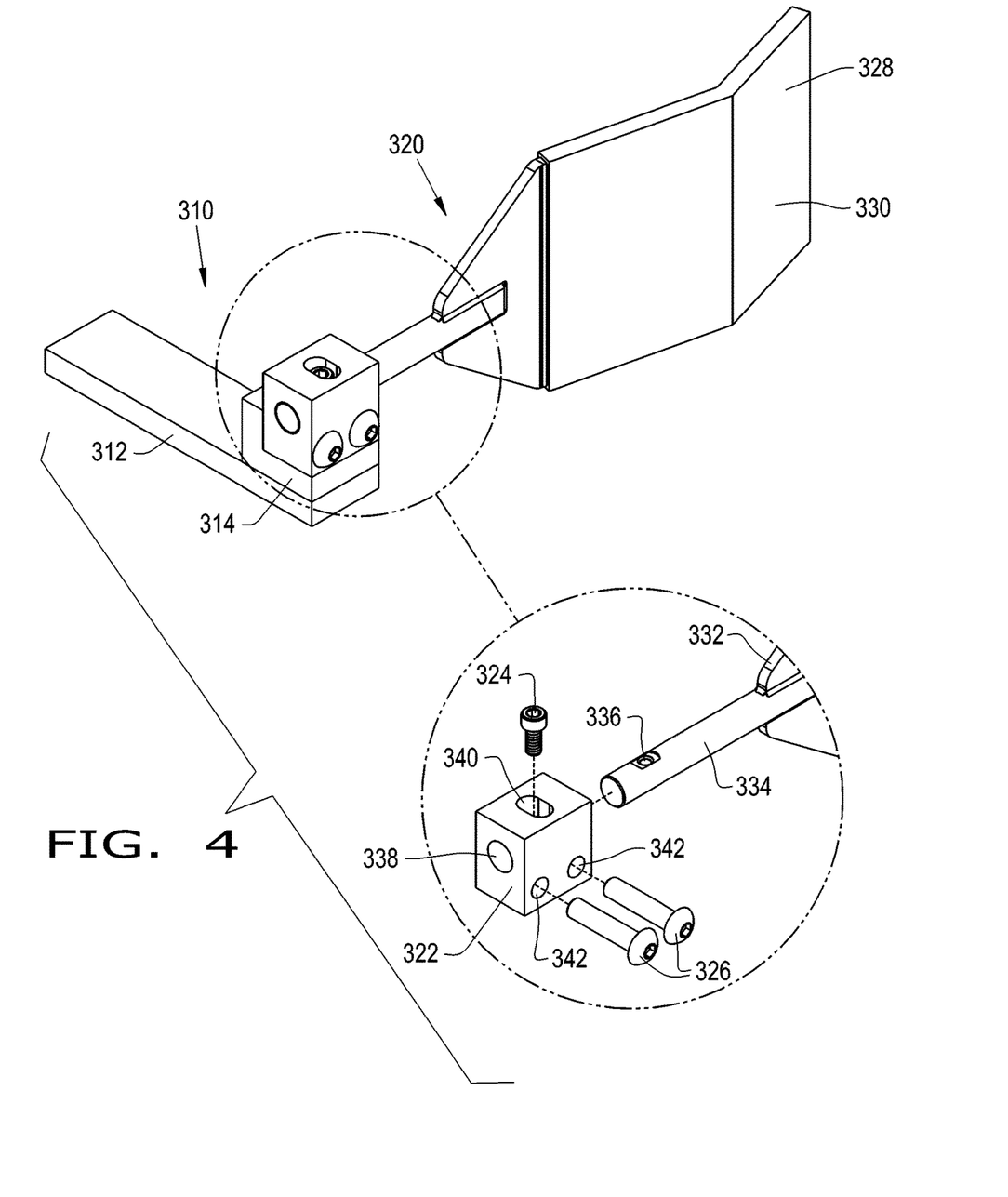
FIG. 4 is an isometric view and exploded view detail of an embodiment of gripper jaw tooling of the present invention.
Figure 5:
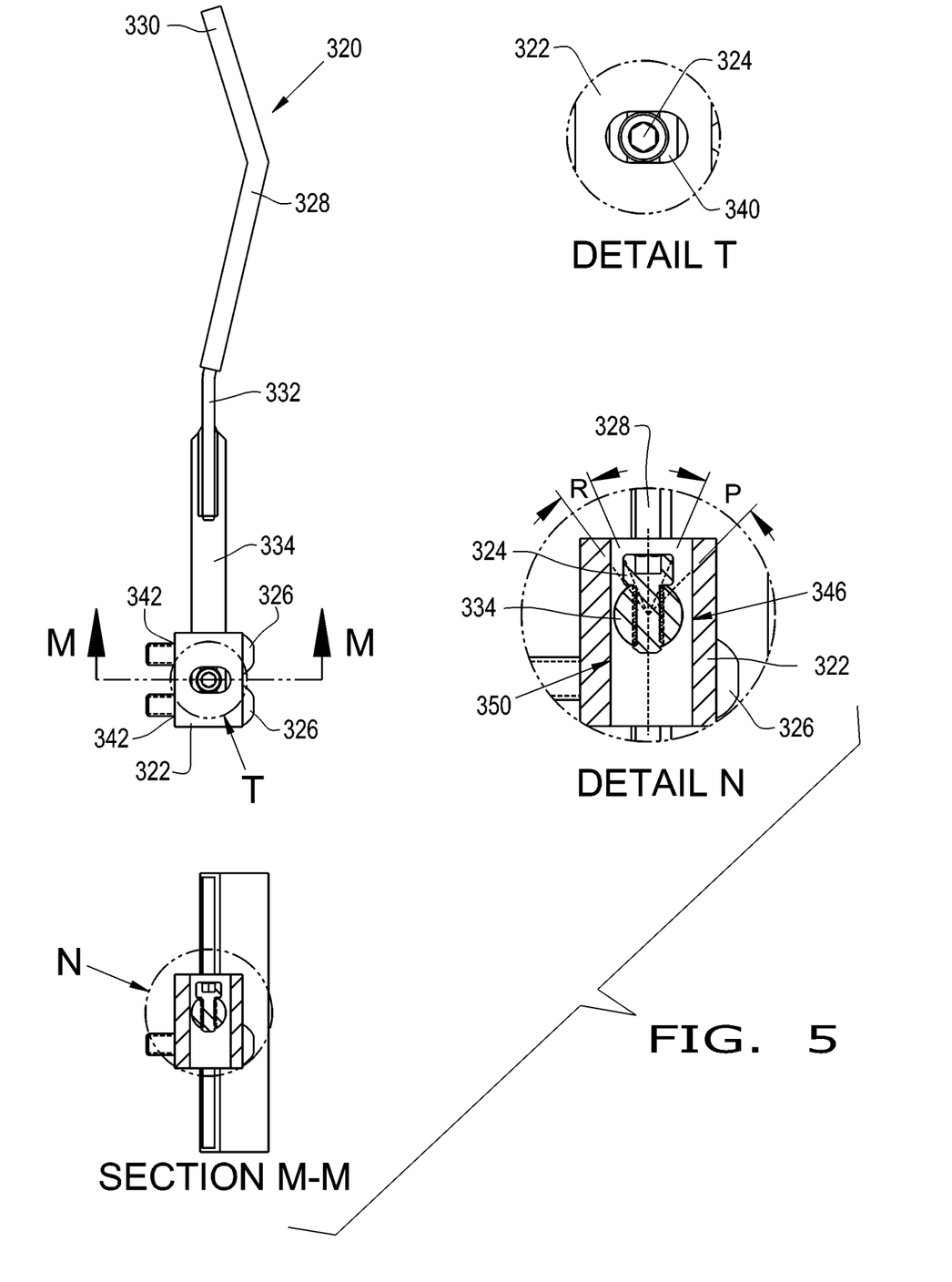
FIG. 5 is a top view of the gripper jaw tooling of FIG. 4.

Referring now to FIGS. 4-5, there is shown another embodiment of a gripping device 310 according to the present invention. Gripping device 310 includes main body 312, at least one gripper jaw 314, and articulating gripper tooling assembly 320. Gripping device 310 includes at least one additional gripper jaw 314 and articulating gripper tooling assembly 320 in order to provide a way of gripping a workpiece.

Articulating gripper tooling assembly 320 includes mounting block 322, stopping fastener, e.g. screw 324, mounting block attachment member(s) 326, and at least one gripping element 328. Gripping element 328 includes finger 330, finger extension 332, and finger shaft 334 with threaded hole 336. Mounting block 322 includes through-hole 338, articulation stop 340 in the form of a limiting recess 340, e.g. a slot or hole 340, and attachment member through-hole(s) 342. Mounting block 322 also includes at least two internal surfaces of the slot or hole 340 which define at least two stopping surfaces 346, 350 (FIG. 5).

Gripping element 328 is rotatably attached to mounting block 322 by inserting finger shaft 334 into through-hole 338 and securing with stopping screw 324. Stopping Screw 324 can be rigidly connected to the shaft 334. For instance, stopping screw 324 can be threaded into finger shaft threaded hole 336. Stopping screw 324 can be off-center relative to the longitudinal axis of recess 340. By way of example, threaded hole 336 can be off-center or otherwise not coaxial with the transverse or vertical axis of shaft 334 such that the stopping screw 324 is off-center relative to the transverse axis of shaft 334. Additionally, recess 340 can be off-set from the centerline of the through hole 338 so that the longitudinal axis of stopping screw 324 upon insertion into threaded hole 336 can be offset, i.e., not equidistant, from the interior side walls of recess 340. Mounting block 322, with or without gripping element 328 rotatably attached, is attached to jaw 314 by attachment member(s) 326 and through-hole(s) 342.

Now referring to FIG. 5, the operation of articulating gripper tooling assembly 320 is described. Section M-M illustrates the bi-directional rotational direction ("articulation") of gripping element 328 with respect to mounting block 322. The bi-directional rotation is limited as shown in Detail N. The stopping surfaces 346 and 350 reside in the path of stopping screw 324 as shown in Detail N. When attached to mounting block 322 by stopping screw 324, gripping element 328 is free to rotate in a clockwise direction until the head of stopping screw 324 contacts stopping surface 346, thereby preventing additional clockwise rotation. Similarly, gripping element 328 is free to rotate in a counterclockwise direction until the head of stopping screw 324 contacts stopping surface 350, thereby preventing additional counterclockwise rotation.

In one embodiment, the articulating angle P of gripping element 328 with respect to mounting block 322 is limited to 21 degrees in the clockwise direction, and the articulating angle R of gripping element 328 with respect to mounting block 322 is limited to 13 degrees in the counterclockwise direction as viewed in Detail N.

The horizontal distance from the longitudinal axis of stopping screw 324 to either the outer edge of stopping surface 346 or the outer edge of stopping surface 350 alters the rotating (articulating) angle in the respective direction of rotation. More specifically, increasing the horizontal distance from the longitudinal axis of stopping screw 324 to either the outer edge of stopping surface 346 or the outer edge of stopping surface 350 will increase the angle that the gripping element 328 will be free to articulate. Likewise, decreasing the horizontal distance from the longitudinal axis of stopping screw 324 to either the outer edge of stopping surface 346 or the outer edge of stopping surface 350 will decrease the angle that the gripping element 328 will be free to articulate. The horizontal distance between the longitudinal axis of stopping screw 324 and stopping surfaces 346, 350 can be adjusted by altering the position of shaft threaded hole 336 and/or the position of recess 340. As shown, the longitudinal axis of stopping screw 324 is horizontally offset from the longitudinal axis of recess 340.

The vertical distance from the center of finger shaft 334 to the top of the head of stopping screw 324 also alters the rotating (articulating) angle in both directions. More specifically, increasing the vertical distance from the center of finger shaft 334 to the top of the head of stopping screw 324 will decrease the angle that the gripping element 328 is free to articulate. Likewise, decreasing the vertical distance from the center of finger shaft 334 to the top of the head of stopping screw 324 will increase the angle that the gripping element 328 is free to articulate.

The diameter of the head of stopping screw 324 also alters the rotating (articulating) angle in both directions. More specifically, increasing the diameter of the head of stopping screw 324 will decrease the angle that the gripping element 328 is free to articulate. Likewise, decreasing the diameter of the head of stopping screw 324 will increase the angle that the gripping element 328 is free to articulate.

Figure 6:
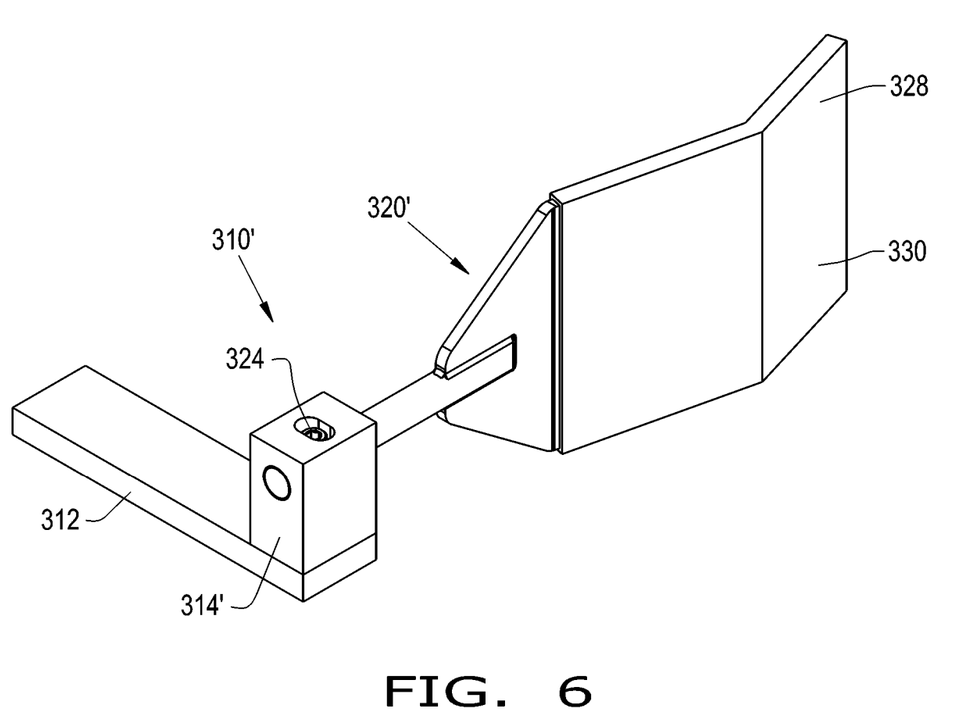
FIG. 6 is an isometric view of an alternate embodiment of the gripper jaw tooling of FIG. 4.

Referring now to FIG. 6, another embodiment of a gripper device 310' is shown with gripper tool assembly 320'. The only difference between 310' and 310 is that gripper tooling assembly 320' does not include a separate mounting block 322 with attachment members 326 or through-holes 342; gripping element 328 is rotatably coupled directly to at least one articulating finger jaw 314'. Finger jaw 314' includes a body with an integrated mounting block that has a limiting recess, e.g. a slot or hole, which defines at least two stopping surfaces (unnumbered). Like elements have been identified with like reference characters.

According to another aspect of the present invention, an operator and/or control system may conduct a method for gripping a workpiece. The method may include an initial step of providing a gripping device 210', 210, 310', 310, as discussed above. The method may also include a step of positioning the gripping device 210', 210, 310', 310 relative to the workpiece. Thereafter, the method may then include a step of actuating the gripping device 210', 210, 310', 310 so that the at least one gripping element thereof contacts the workpiece, which then causes the shaft to rotate until the stopping member contacts one of the stopping surfaces. The method may further include a step of adjusting a rotational limit of the shaft by adjusting a position of the stopping member relative to the shaft.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A gripping device for gripping a workpiece, comprising:
at least one gripping element configured for contacting the workpiece, the at least one gripping element including a shaft;
at least one articulating finger jaw;
a mounting block connecting the shaft to the at least one articulating finger jaw, the mounting block including an articulation stop having a first stopping surface and a second stopping surface, the first stopping surface and the second stopping surface opposing one another; and
a stopping member connected to the shaft, the stopping member being configured for contacting one of the first stopping surface and the second stopping surface to limit a rotation of the shaft relative to the mounting block, the stopping member being in the form of a fastener which is inelastic.

2. The gripping device of claim 1, wherein the stopping member is rigidly connected to the shaft.

3. The gripping device of claim 1, wherein the first stopping surface defines a first articulating angle of the at least one gripping element which sets a first rotational limit of the shaft in a first rotational direction, wherein the second stopping surface defines a second articulating angle of the at least one gripping element which sets a second rotational limit of the shaft in a second rotational direction which is opposite to the first rotational direction.

4. The gripping device of claim 1, wherein the mounting block includes a body, wherein the articulation stop of the mounting block is in the form of a recess.

5. The gripping device of claim 1, wherein the recess includes interior walls, wherein the first stopping surface is a first interior wall of the recess and the second stopping surface is a second interior wall of the recess.

6. The gripping device of claim 5, wherein the stopping member is horizontally offset relative to the recess.

7. The gripping device of claim 1, wherein the stopping member is in the form of the fastener, wherein the fastener is an adjustable fastener such that an adjustable position of the fastener relative to the shaft can adjust a rotational limit of the shaft.

8. The gripping device of claim 7, wherein the adjustable fastener is in the form of a screw.

9. The gripping device of claim 1, wherein the stopping member defines a longitudinal axis that is parallel to each of the first stopping surface and the second stopping surface when the stopping member is in a position such that the longitudinal axis is oriented vertically.

10. A method of gripping a workpiece, the method comprising:
   providing a gripping device for gripping a workpiece, the gripping device including at least one gripping element configured for contacting the workpiece, the at least one gripping element including a shaft, at least one articulating finger jaw, a mounting block connecting the shaft to the at least one articulating finger jaw, the mounting block including an articulation stop having a first stopping surface and a second stopping surface, and a stopping member connected to the shaft, the first stopping surface and the second stopping surface opposing one another, the stopping member being in the form of a fastener which is inelastic;
   positioning the gripping device relative to the workpiece; and
   actuating the gripping device so that the at least one gripping element contacts the workpiece and the shaft rotates relative to the mounting block until the stopping member contacts one of the first stopping surface and the second stopping surface.

11. The method of claim 10, further including adjusting a rotational limit of the shaft by adjusting a position of the stopping member relative to the shaft.

12. The method of claim 10, wherein the mounting block includes a body, wherein the articulation stop of the mounting block is in the form of a recess.

13. The method of claim 12, wherein the recess includes interior walls, wherein the first stopping surface is a first interior wall of the recess and the second stopping surface is a second interior wall of the recess.

14. The method of claim 13, wherein the stopping member is horizontally offset relative to the recess.

15. The method of claim 10, wherein the stopping member is in the form of the fastener, wherein the fastener is an adjustable fastener such that an adjustable position of the fastener relative to the shaft can adjust a rotational limit of the shaft.

* * * * *

UNITED STATES PATENT AND TRADEMARK OFFICE
CERTIFICATE OF CORRECTION

| | |
|---|---|
| PATENT NO. | : 11,685,061 B2 |
| APPLICATION NO. | : 17/727228 |
| DATED | : June 27, 2023 |
| INVENTOR(S) | : Tod A. Gunder |

It is certified that error appears in the above-identified patent and that said Letters Patent is hereby corrected as shown below:

In the Claims

Column 6
At Line 52 in Claim 5, please delete "claim 1," and substitute therefore --claim 4,"--.

Signed and Sealed this
Sixth Day of August, 2024

Katherine Kelly Vidal
*Director of the United States Patent and Trademark Office*